(12) United States Patent
Wen

(10) Patent No.: US 9,667,072 B2
(45) Date of Patent: May 30, 2017

(54) MOBILE POWER DEVICE WITH MEMORY STORAGE FEATURE WHICH SWITCHES BETWEEN MASTER AND SLAVE ROLES

(71) Applicants: Shenzhen Hello Tech Energy Co., Ltd., Shenzhen (CN); Guangzhou Xinker Software Technology Co., Ltd., Tianhe, Guangzhou, Guangdong (CN)

(72) Inventor: Meichan Wen, Shenzhen (CN)

(73) Assignees: Shenzhen Hello Tech Energy Co., Ltd., Shenzhen (CN); Guangzhou Xinker Software Technology Co., Ltd., Guangzhou (CN)

( * ) Notice: Subject to any disclaimer, the term of this patent is extended or adjusted under 35 U.S.C. 154(b) by 177 days.

(21) Appl. No.: 14/315,184

(22) Filed: Jun. 25, 2014

(65) Prior Publication Data

US 2015/0263554 A1  Sep. 17, 2015

(30) Foreign Application Priority Data

Mar. 13, 2014 (CN) .......................... 2014 1 0093600

(51) Int. Cl.
*H02J 7/00* (2006.01)
*G06F 1/26* (2006.01)

(52) U.S. Cl.
CPC .............. *H02J 7/0004* (2013.01); *G06F 1/26* (2013.01); *H02J 2007/0001* (2013.01); *H02J 2007/0096* (2013.01)

(58) Field of Classification Search
None
See application file for complete search history.

(56) References Cited

U.S. PATENT DOCUMENTS

| | | | |
|---|---|---|---|
| 8,541,985 B1* | 9/2013 | Wong .................... | G06F 1/1632 320/112 |
| 2005/0009468 A1* | 1/2005 | Morozumi ............ | G06F 13/385 455/39 |

(Continued)

FOREIGN PATENT DOCUMENTS

| | | |
|---|---|---|
| CN | 201409005 Y | 2/2010 |
| CN | 201707919 U | 1/2011 |

(Continued)

OTHER PUBLICATIONS

Selected Portions of On-The-Go Supplement to the USB 2.0 Specification Revision 1.0, Dec. 18, 2001.*

(Continued)

*Primary Examiner* — Thomas Lee
*Assistant Examiner* — Danny Chan
(74) *Attorney, Agent, or Firm* — Coats & Bennett, PLLC

(57) ABSTRACT

A mobile power device with storage feature is disclosed. The mobile power device with storage feature includes a battery, an output module, a central processing unit, and a data storing module. The data storing module includes a storing circuit and a controlling circuit. The central processing unit is configured to detect whether an electronic device is connected, after the electronic device is connected, the central processing unit recognizes the electronic device as a slave device, recognizes the mobile power device with storage feature as a master device. The central processing unit further detects whether an operating system of the electronic device is a target operating system, after the central processing unit detects that the operating system of the electronic device is the target operating system, the central processing unit recognizes the electronic device as a master device, and recognizes the mobile power device with storage feature as a slave device.

10 Claims, 13 Drawing Sheets

(56) References Cited

U.S. PATENT DOCUMENTS

| | | | |
|---|---|---|---|
| 2005/0251589 A1* | 11/2005 | Wang | G06F 21/31 710/5 |
| 2013/0154571 A1 | 6/2013 | Hou et al. | |
| 2013/0306726 A1* | 11/2013 | Wong | H02J 7/0054 235/440 |
| 2014/0013128 A1* | 1/2014 | Wong | G06F 1/26 713/300 |
| 2015/0181165 A1* | 6/2015 | Iltus | H04N 7/15 348/14.09 |
| 2016/0004650 A1* | 1/2016 | Yamasaki | G06F 1/266 710/63 |

FOREIGN PATENT DOCUMENTS

| | | |
|---|---|---|
| CN | 102142696 A | 8/2011 |
| CN | 202721463 U | 2/2013 |
| CN | 103440112 A | 12/2013 |

OTHER PUBLICATIONS

ChargeTech: 2 in 1 Keychain Battery Pack (Apple iPhone Lightning 8-Pin) 1000mah Portable Cell Phone Charger Battery Pack w/Built in USB Cable—For Apple iPhone iPad iPod Devices, Amazon.*
Keychain Charger Battery Power Pack—3 in 1 with USB Flash Drive—ChargeAll, Youtube.*
Molife M-ML-MC9901 Power Bank 2600 mah with 8 GB Interal Memory (White), Amazon.*

* cited by examiner

MOBILE POWER DEVICE WITH MEMORY STORAGE FEATURE WHICH SWITCHES BETWEEN MASTER AND SLAVE ROLES

CROSS-REFERENCED TO RELATED APPLICATIONS

This application claims priority to Chinese Application No. 201410093600.7, "MOBILE POWER DEVICE WITH STORAGE FEATURE", filed on Mar. 13, 2014, which is hereby incorporated by reference in its entirety.

FIELD OF THE INVENTION

The present invention relates to power supply device technologies, and more particularly relates to a mobile power device with storage feature.

BACKGROUND OF THE INVENTION

With a rapid development of information technology, portable electronic devices, such as mobile phones and tablet PCs have various functions that bring great convenience to people's daily life. Portable electronic devices are convenient to carry. Portable electronic devices, such as mobile phones, are also used to store information. However, most portable electronic devices can only be used as slave devices. That is, they connect to master devices such as computers through data lines to achieve data exchanging between storing devices. The common electronic devices cannot extend their memory through direct connection to external storing devices, which is not convenient for people to use these electronic devices. Besides, with diversification of functions of the electronic devices, people use electronic devices more and more frequently. As a result, ordinary electronic devices run out of power easily, causing inconvenience in people's daily life.

SUMMARY OF THE INVENTION

The present invention is directed to provide a mobile power device, which can provide power and external storage to the electronic devices.

A mobile power device with storage feature includes: a battery, an output module, a central processing unit, and a data storing module. The output module is connected to the battery; the central processing unit is connected to the output module; and the data storing module is connected to the central processing unit, the data storing module includes: a storing circuit and a controlling circuit. The storing circuit is configured to store data; and the controlling circuit is configured to exchange data and communicate with an electronic device having a target operating system according to an instruction of the central processing unit; the central processing unit is configured to detect whether the electronic device is connected, if the central processing unit detects that the electronic device is connected, the electronic device is recognized as a slave device and the mobile power device with storage feature is recognized as a master device, and the central processing unit sends a discharging control instruction to control the output module to provide power to the electronic device; the central processing unit is also configured to further detect whether an operating system of the electronic device is the target operating system; when the central processing unit detects that the operating system of the electronic device is the target operating system, the electronic device is recognized as a master device and the mobile power device with storage feature is recognized as a slave device, the central processing unit manages data in the data storing module according to an operating instruction sent by the electronic device.

The above mobile power device can provide power and external memory to an electronic device. Such mobile power device saves space and is easy to carry.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION OF THE EMBODIMENTS

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
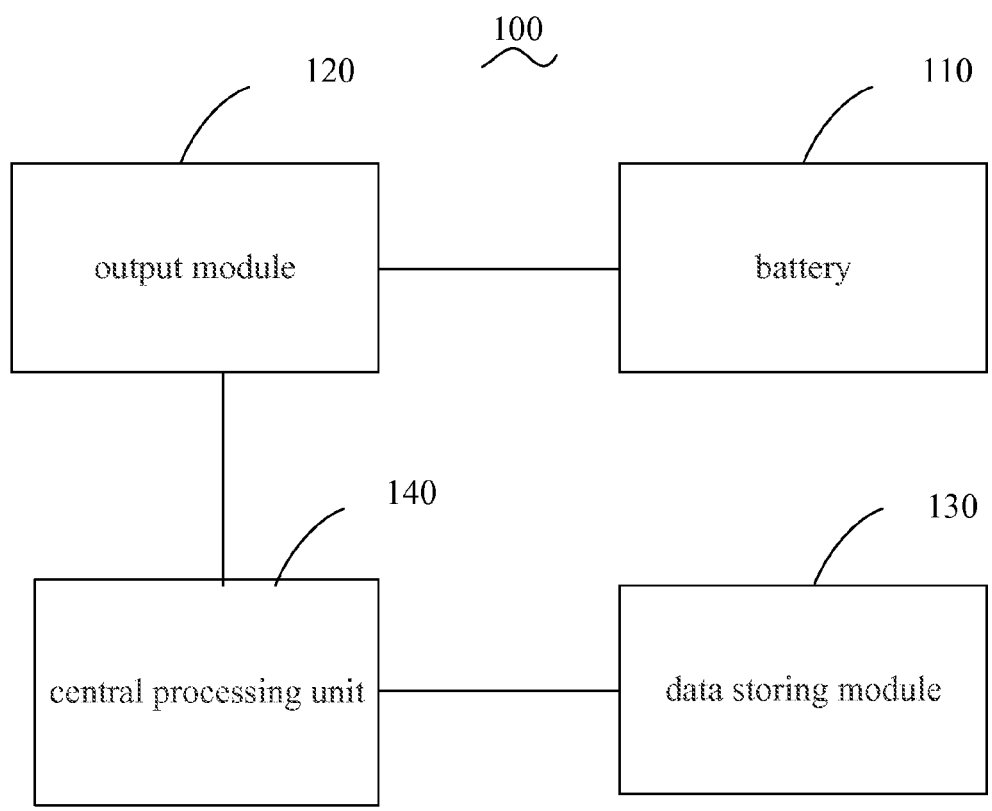
FIG. 1 is a block diagram of a mobile power device with storage feature according to one embodiment.

Referring to FIG. 1, a first embodiment of a mobile power device 100 with storage feature is used to provide power to an electronic device and provide an external memory to the electronic device. The mobile power device 100 includes a battery 110, an output module 120, a data storing module 130, and a central processing unit 140. The electronic device comprises an operating system and can be a mobile phone, a PDA, a tablet computer, a camera, or a video recorder.

The battery 110 can be a single battery. It can also be a battery pack composed of a plurality of battery cells. In the illustrated embodiment, the battery 110 is a Li ion battery, which can store or release energy through electrochemical reaction to achieve a charging or a discharging function. In an alternative embodiment, the battery 110 can be a lithium-polymer battery, a lead-acid battery, or a nickel-metal hydride battery.

The output module 120 is connected to the battery 110 and the central processing unit 140 respectively. The output module 120 is configured to boost a voltage of the battery 110 and then output the voltage according to a discharging controlling instruction of the central processing unit 140. Specifically, when the central processing unit 140 detects that an electronic device is connected, the central processing unit 140 sends a discharging controlling instruction to the output module 120. The output module 120 begins to work when it receives the discharging controlling instruction, then the output module 120 boosts a voltage of the battery 110 by a booster circuit and provides power to the connected electronic device. In the illustrated embodiment, an output voltage of the battery 110 is 3.7 V. The output module 120 boosts the output voltage to 5V/2.1A and then outputs it.

Figure 2:
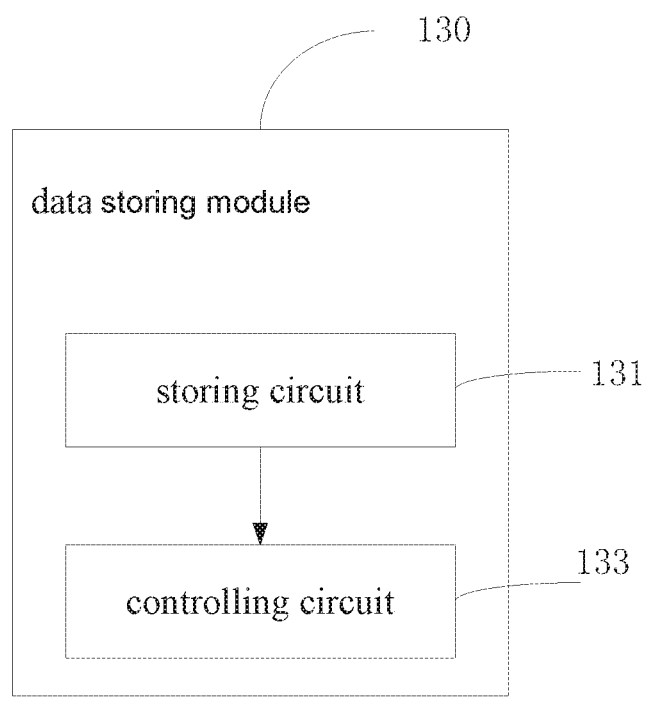
FIG. 2 is a block diagram of a data storing module according to one embodiment.

The data storing module 130 arid the central processing unit 140 are connected. Referring to FIG. 2, the data storing module 130 includes a storing circuit 131 and a controlling circuit 133. The storing circuit 131 is configured to store data, Specifically, the storing circuit 131 is a nonvolatile memory, and it provides an underlying 0/1 format storing function, A storing space of the storing circuit 131 can be up to 8G to 256G, or even larger, which can be set according to a requirement of the user, and it is not limited to a specific value. The controlling circuit 133 is configured to exchange data and communicate with the electronic device having a target operating system according to an instruction of the central processing unit. As the operating systems vary with different electronic devices, the controlling circuit 133 may communicate and exchange data with a particular operating system. In the illustrated embodiment, an operating system which can exchange data and communicate with the controlling circuit 133 is regarded as the target operating system. Specifically, the controlling circuit 133 is an integrated chip which can communicate and exchange data with the electronic device. For example, when the target operating system is an iOS operating system, the controlling circuit 133 can underlyingly exchange data and communicate with the electronic device (such as an Phone or an iPad) having the operating system using an integrated chip authenticated by Apple CP2.0C. In the illustrated embodiment, the data storing module 130 uses Nand-Flash memory as a storing media. In the alternative embodiment, the data storing module 130 can also use other non-violate storing media, such as hard disk drive (HDD), USB flash disk, and SD card.

The central processing unit 140 is configured to manage the mobile power device 100. In the illustrated embodiment, the central processing unit 140 is configured to detect whether an electronic device is connected. When the central processing unit 140 detects an electronic device is connected, it sends the discharging controlling instruction to the output module 120 The output module 120 begins to work when it receives the discharging controlling instruction The output module 120 boosts a voltage of the battery 110 and then provides power to the connected electronic device. During discharging process, the central processing unit 140 is also configured to detect the battery level of the battery 110. When it detects the battery level is low, the central processing unit 140 sends a low battery level alert, When the central processing unit 140 detects that the battery level of battery 110 is too low to discharge, it sends a stop instruction to the output module 120. When the output module 120 receives the stop instruction, it stops work.

In the illustrated embodiment, when the central processing unit 140 detects that an electronic device is connected, it recognizes the electronic device as a slave device and recognizes the mobile power device 100 with storage feature as a master device. After the central processing unit 140 recognizes the electronic device as the slave device, the central processing unit 140 further detects whether the operating system of the electronic device is the target operating system. When the central processing unit 140 detects that the operating system of the electronic device is the target operating system, the central processing unit 140 changes the electronic device to a master device from a slave device, and changes the mobile power device 100 with storage feature to a slave device from a master device, and sends the change information to the electronic device. After the electronic device receives the change information, it recognizes the electronic device as a master device and recognizes the mobile power device 100 with storage feature as a slave device synchronously. When the electronic device is recognized as a master device, the electronic device may send an operating instruction to the central processing unit 140. The central processing unit 140 manages data of the storing circuit 131 according to a received operating instruction.

Specifically, the central processing unit 140 receives a read or write instruction from an electronic device, and reads or writes data of the storing circuit 131 according to the read or write instruction to achieve a data exchanging between a memory inside the electronic device and the data storing module 130 of the mobile power device 100 with storage feature. In the illustrated embodiment, the electronic device is installed with an APP configured to manage the data storing module 130. The APP can be downloaded from a related software store. When the electronic device is first connected to the mobile power device 100 with storage feature, the central processing unit 140 will send a requirement of installing an APP to the electronic device. Such requirement may contain a link to download the APP. Users can click on the link to download the APP or they can download the APP on the software store. Then the users will send a read or write instruction to the central processing unit through the installed APP. The central processing unit 140 reads or writes the data of the data storing module 130 according to the received read or write instruction to achieve a copying, a pasting, and a playing function to the data in the data storing module. For example, in our daily life, if the memory of a mobile phone is not big enough for a big video file, the users can store the video file in the data storing module 130 of the mobile power device 100 with storage feature. When the users need to play the video file, they just need to connect the mobile phone to the mobile power device 100, the video file thus can be played by the installed APP.

When the central processing unit 140 detects that the operating system of the electronic device is not the target operating system, the controlling circuit 133 of the data storing module 130 cannot communicate with the electronic device, and the mobile power device 100 with storage feature can only provide power to the electronic device.

In the above mobile power device 100, when the central processing unit 140 detects that an electronic device is connected, it sends a discharging controlling instruction to control the output module 120 to provide power to the electronic device. Meanwhile, the central processing unit 140 can switch automatically between the master device and the slave device to the electronic device. The users can send various operating instructions to manage the data of the data storing module 130 according to a requirement, and data communication between the data storing module 130 and a memory inside the electronic device can also be achieved. The above mobile power device 100 can provide power to the electronic device and also provide external memory to the electronic device, it is easy to carry. Besides, the connection between the mobile power device 100 with storage feature and the electronic device is easy to be achieved, which brings great convenience to people's daily life.

Figure 3:
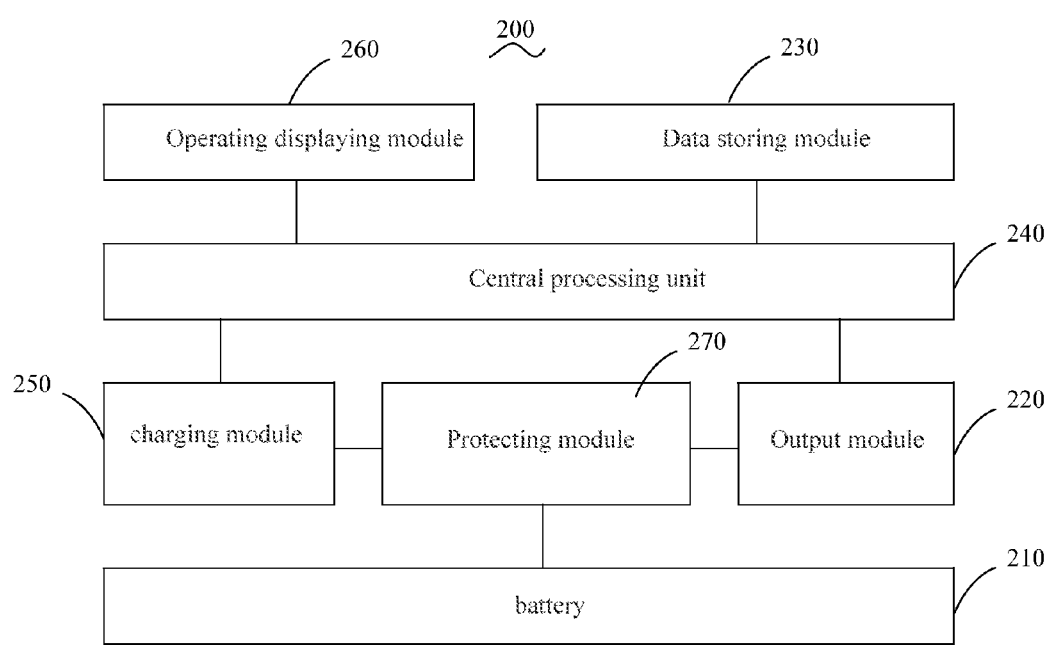
FIG. 3 is a block diagram of a mobile power device with storage feature according to another embodiment.

Referring to FIG. 3, a second embodiment of a mobile power device 200 includes a battery 210, an output module 220, a data storing module 230, a central processing unit 240, a charging module 250, an operating displaying module 260, and a protecting module 270. The battery 210 is connected to the protecting module 270. The output module 220 and the charging module 250 are connected to the battery 210 through the protecting module 270. The output module 220, the charging module 250 are also connected to the central processing unit 240. The data storing module 230, the operating displaying module 260 are connected to the central processing unit 240.

The charging module 250 is configured to convert, an external power supply voltage into a charging voltage and then charge the batten 210. Specifically, when the central processing unit 240 detects that an external power supply is connected, the central processing unit 240 sends a charging controlling instruction to the charging module 250. After the charging module 250 receives the charging controlling instruction, it converts an input power supply voltage into a charging voltage, and then charges the battery 210 at a constant voltage and a constant current through the protecting module 270. In the illustrated embodiment, a voltage of the connected external power supply is 5V. The charging module 250 converts the 5V voltage to 4.2V voltage and then charges the battery 210 at a constant current according to the received charging controlling instruction. The above constant current can be set according to a requirement, the constant current may be 0.5 A, 1 A. or 2 A.

The operating displaying module 260 is configured to display a battery level information and a battery status of the battery 210 according to an instruction sent by the central processing unit 240 The operating displaying module 260 is also configured to display the data stored in the data storing module 230 according to an instruction of the central processing unit 230. Specifically, the operating displaying module 260 includes a displaying unit and an operating unit. The operating unit is used for users to operate and send various commands. The central processing unit 240 converts received commands to corresponding instructions and operates according to the instructions, operating results are finally displayed by the displaying unit. The operating unit can be a button, a touch control, or a rocker switch. The displaying unit is a LCD screen or a LED screen. In the illustrated embodiment, the operating unit is a button.

Specifically, when the users need to inquire about the battery level of the battery 210, they can push a battery level inquiring button to send a battery level inquiring command. After the central processing unit 240 receives the battery level inquiring command, it controls the displaying unit to display the battery level and the battery status of the battery 210. The battery level of the battery 210 is precisely displayed by the LCD screen or the LED screen, thus the users can know the battery level and the status of the battery 210. When the users want to view data of the data storing module, they can push a corresponding button to send a viewing command. The central processing unit 240 operates the displaying module 260 to display viewing results, after it receives the viewing command.

The protecting module 270 is provided with a special power supply protecting integrated chip. When there are safety problems such as overcharging, over discharging, over current, short circuit, and over-temperature in the battery 210, the connection between the battery 210 and the external device is quickly cut off, thus a safety of the battery 210 can be ensured. In the illustrated embodiment, the battery 210 is a Li-ion battery. The Li-ion battery has high activity, when rapid discharging caused by over charging and short circuit occurs, the lithium is easy to be decomposed, which leads to accidents such as explosion and burning. When rapid discharging occurs, the Li-ion battery is prone to function failure. When such problems occur, the protecting module 270 can quickly cut off a connection between the battery 210 and the external device. Specifically, when the protecting module 270 detects that the voltage of the battery is too high, the protecting module 270 cuts off the charging circuit to prevent overcharging. When the protecting module 270 detects that the voltage of the power supply is too low, the protecting module 270 cuts off the discharging circuit to prevent over discharging. When the protecting module 270 detects that the battery charging and discharging current are too large or short circuit, the protecting module 270 would cut off the connection between the battery 210 and the external device to ensure a safety of the battery 210.

In the illustrated embodiment, the mobile power device 200 further includes an input interface, an output interface, and an interface managing chip. The input interface is connected to the charging module 250, the output interface is connected to the output module 220. The input interface is configured to connect to external power supply. The output module is configured to connect to the electronic device. In the illustrated embodiment, the input interface is a Micro-USB interface. There are two output interfaces, both of which are standard USB interfaces. In an alternative embodiment, the input interface can also be a standard USB interface, the output interface can also be a Micro-USB interface. Numbers of the output interface can be set to be one or more. When there are more than one output interfaces, these output interfaces can provide power to more than one electronic device.

After the mobile power device 200 connects to the electronic device through a data line, the mobile power device 200 with storage feature provides power and external memory to the electronic device, thus a space can be saved, the mobile power device 100 with storage feature is easy to carry. As the mobile power device 100 with storage feature is connected and communicated with the electronic device through a data line, a transporting rate can be as high as 10 MB/s, which supports for HD video playback, and a communication speed is stable and reliable. Besides, as the mobile power device 200 with storage feature is connected with the electronic device through a data line, in a data transferring process, a self consumption of the current can be controlled to less than 20 mA, standby power consumption is less than 0.1 mA, thus a using time of the mobile power device 200 with storage feature is increased. In the illustrated embodiment, a using time of the mobile power device 200 with storage feature is 20 times longer than that of the traditional mobile power device 200 which is connected by WiFi. When the mobile power device 200 with storage feature is used, no other network or device is needed, which brings great convenience to the users.

Figure 4:
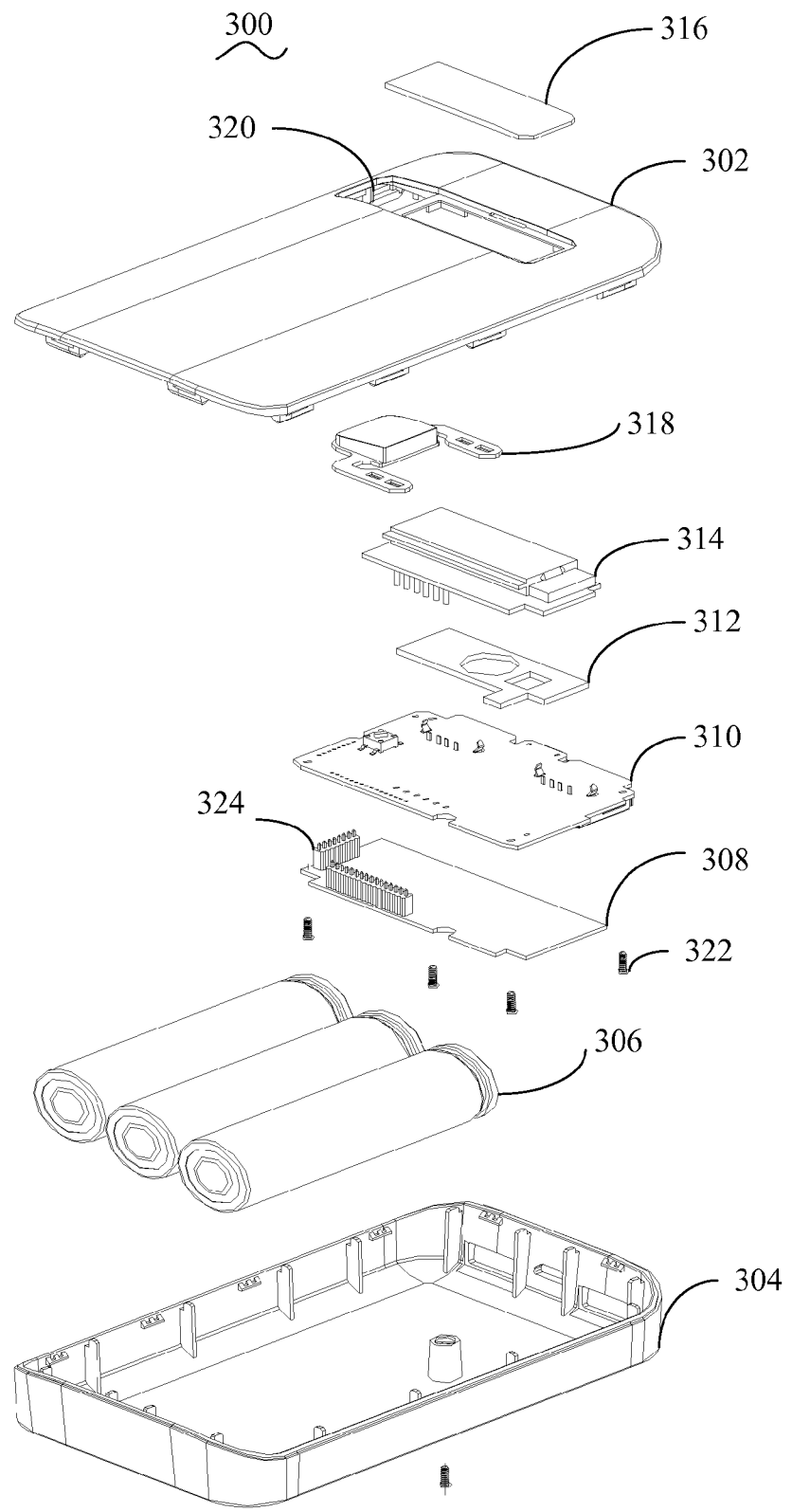
FIG. 4 is a perspective view of a mobile power device with storage feature according to one embodiment.

Referring to FIG. 4, a third embodiment of a mobile power device 300 includes a first housing 302, a second housing 304, a battery pack 306, a first printed circuit board 308, and a second printed circuit board 310. In the illustrated embodiment, the first housing 302 and the second housing 304 are removably connected and form a cavity. The battery pack 306, the first printed circuit board 308, and the second printed circuit board 310 are received in the cavity. Specifically, the first housing 302 and the second housing 304 are removably connected through clips and screws 322. The battery pack 306 includes three battery cells. The first printed circuit board 308 is provided with a data storing module. The second printed circuit board 310 is provided with a charging module, an output module, and a central processing unit. The first printed circuit board 308 and the second printed circuit board 310 are electrically connected through a pin 324.

In the illustrated embodiment, the mobile power device 300 with storage feature includes an operating unit and a displaying unit. Specifically, the operating unit is a button 318. The displaying unit is a LCD screen, which includes a LCD EVA film 312, a LCD module 314, and a LCD lens 316. The LCD module 314 is fixed to the second printed circuit board 310 through the pin 324, and it is also electrically connected to the second printed circuit board 310 through the pin 324. One side of the LCD EVA film 312 is connected to the second printed circuit board 310, the other side is connected to the LCD module 314. The LCD EVA film 312 can fix and support the LCD module 314. The button 318 and the LCD lens 316 are fixed to a window 320 of the first housing 302. The second printed circuit board 310 is fixed to the first housing 302 through the screws 322.

Figure 5:
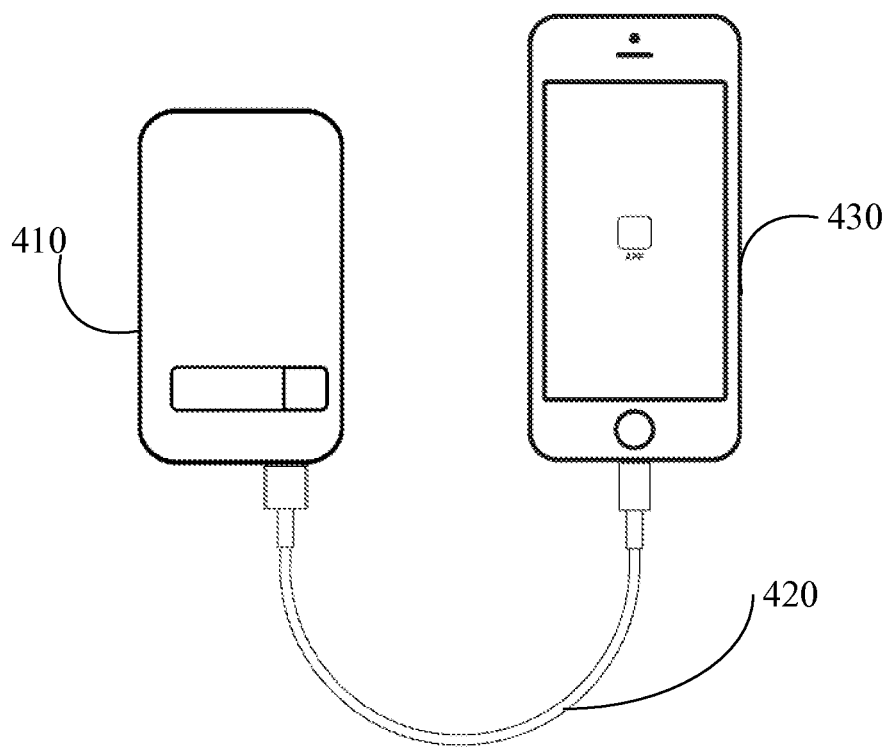
FIG. 5 is a schematic view showing connection between the mobile power device with storage feature and the electronic device according to a specific embodiment.
Figure 6:
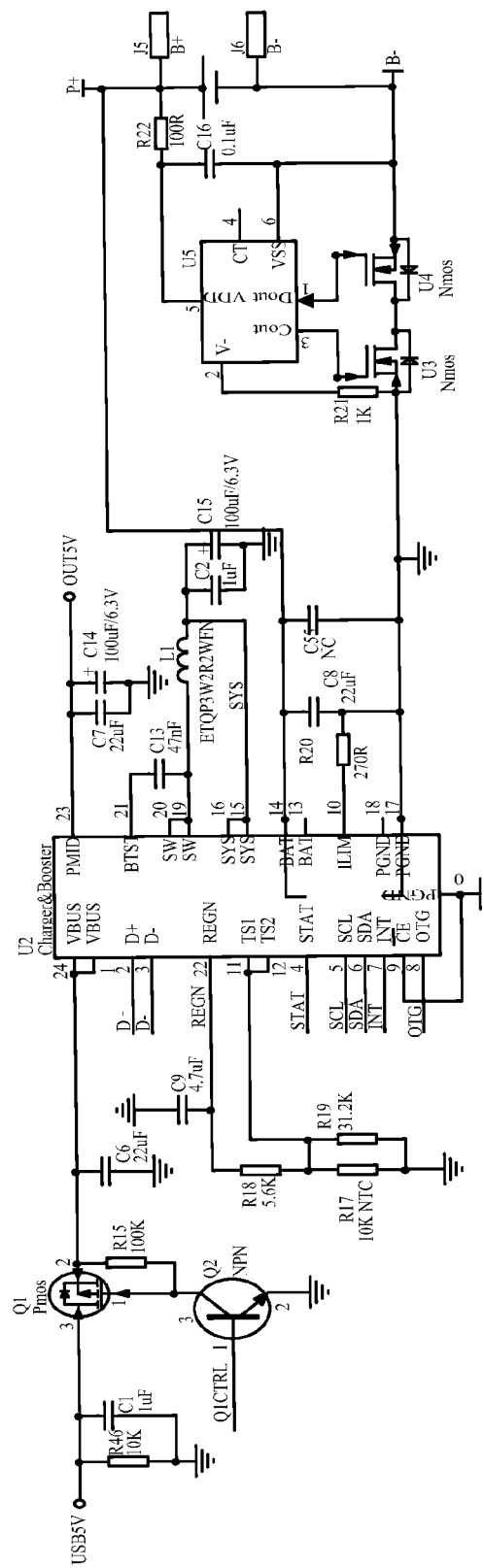
FIG. 6-FIG. 9 are partial schematic circuit diagrams of the mobile power device with storage feature according to one embodiment.
Figure 7:
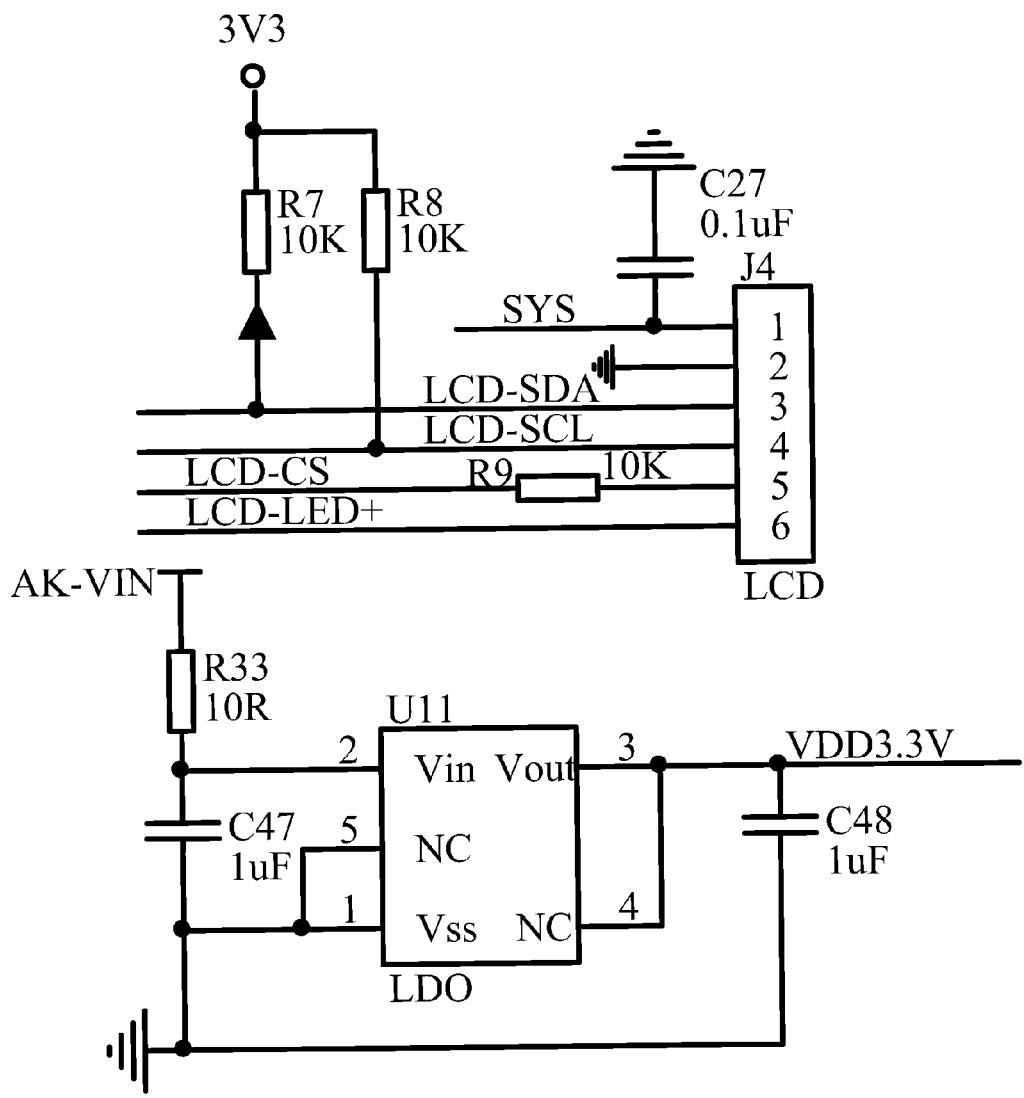
Figure 8:
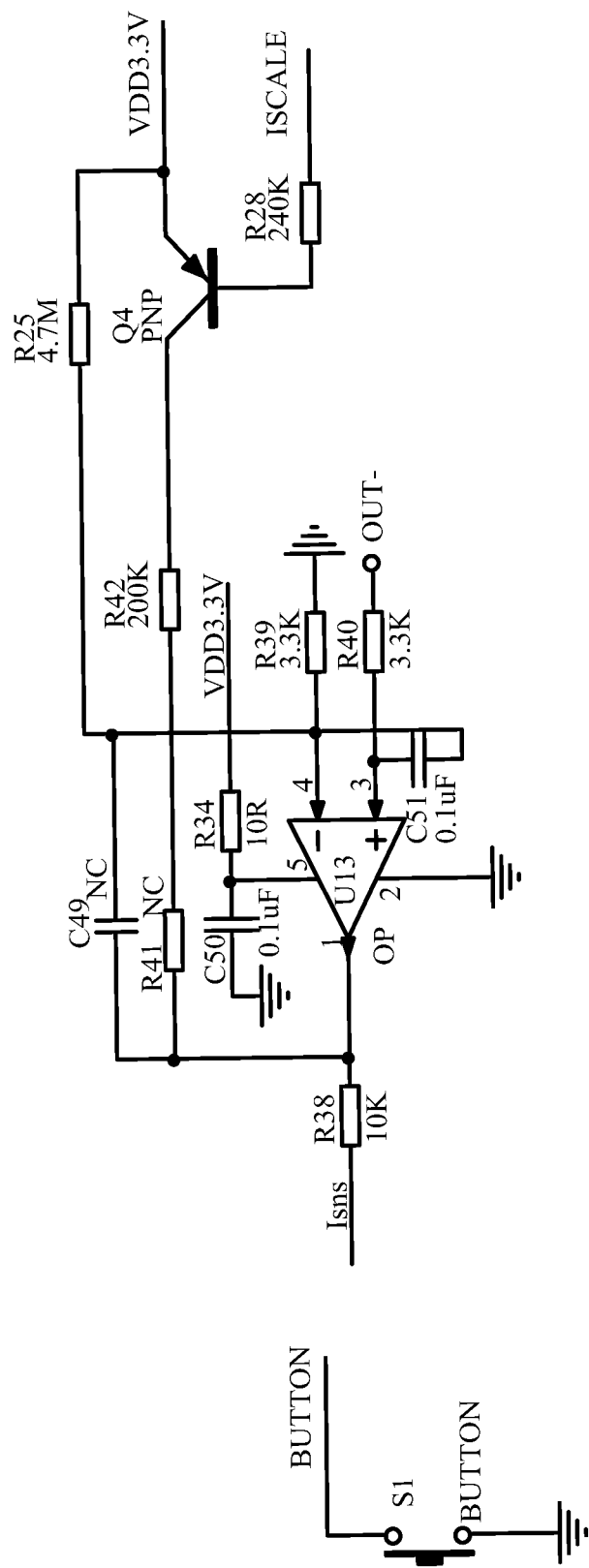
Figure 9:
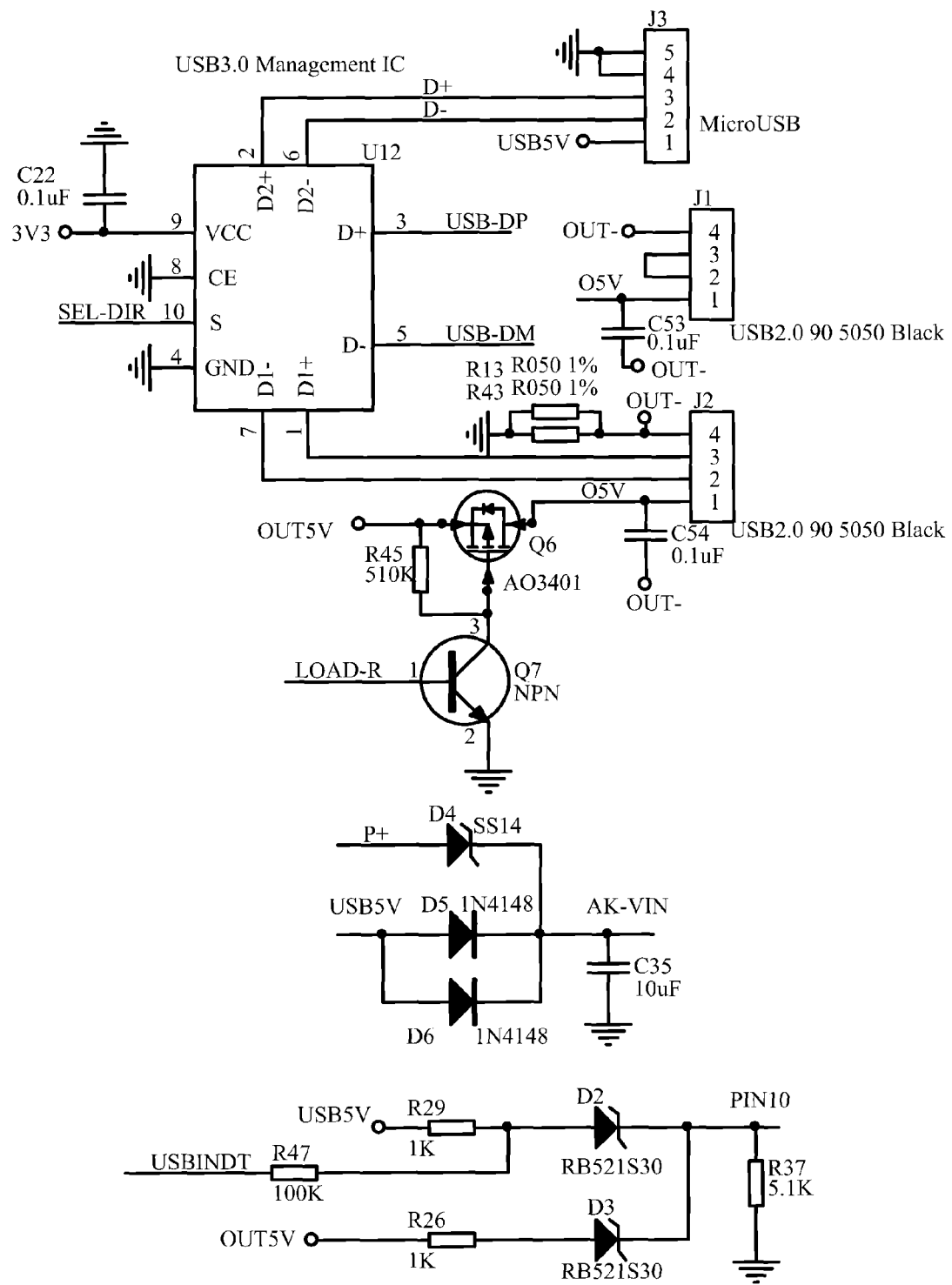
Figure 10:
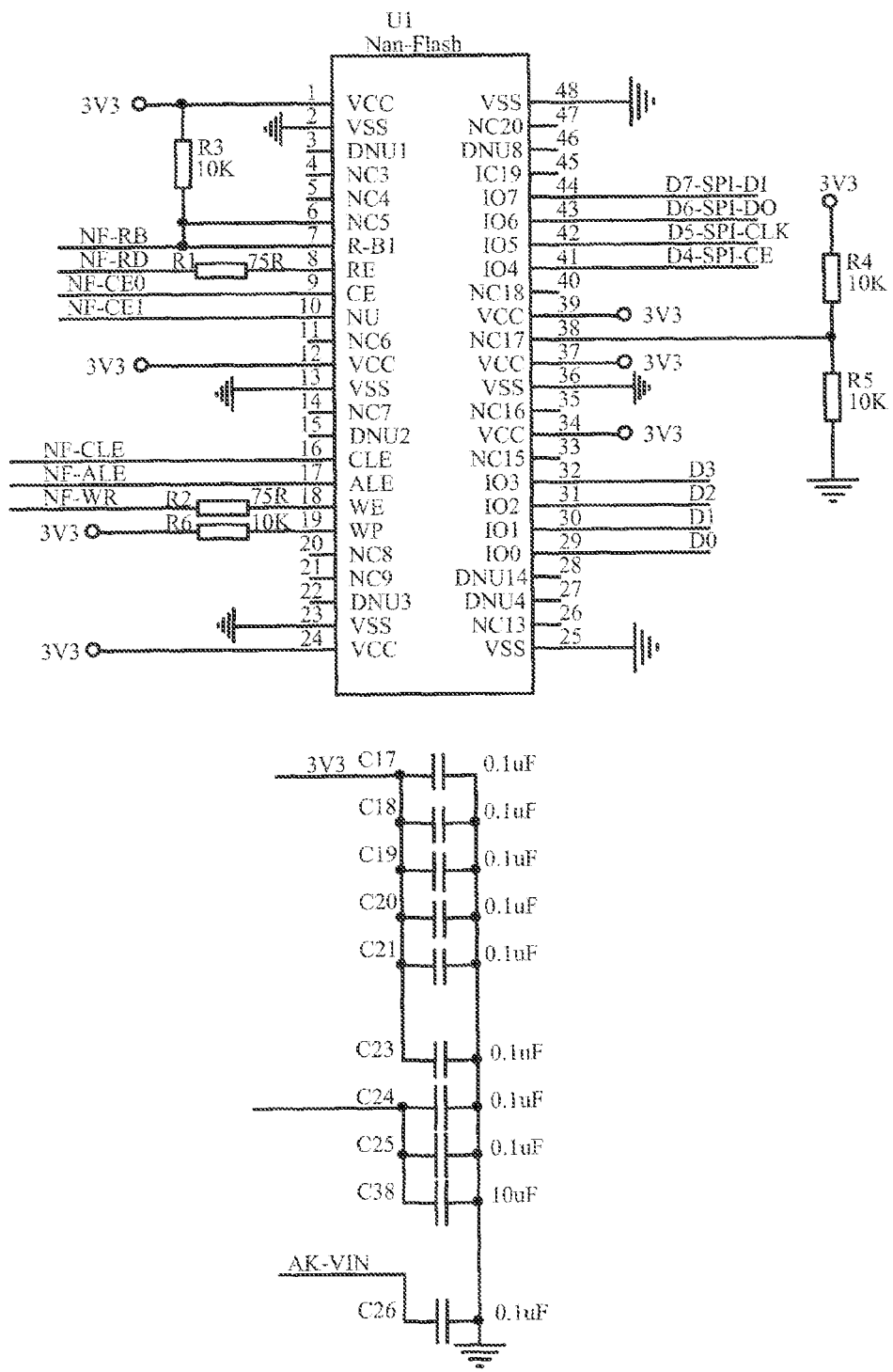
FIG. 10-FIG. 13 are another partial schematic circuit diagrams of the mobile power device with storage feature according to one embodiment.
Figure 11:
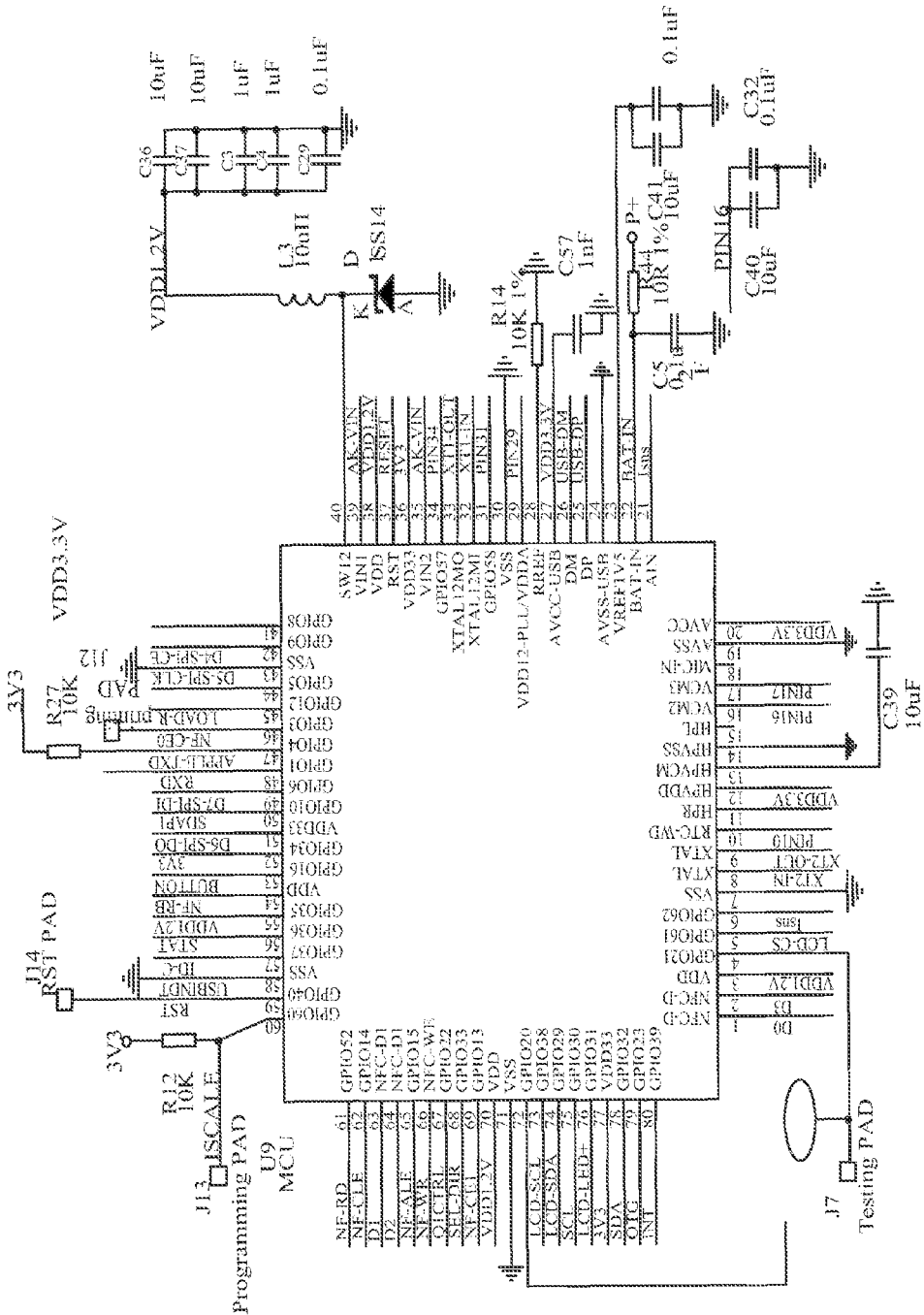
Figure 12:
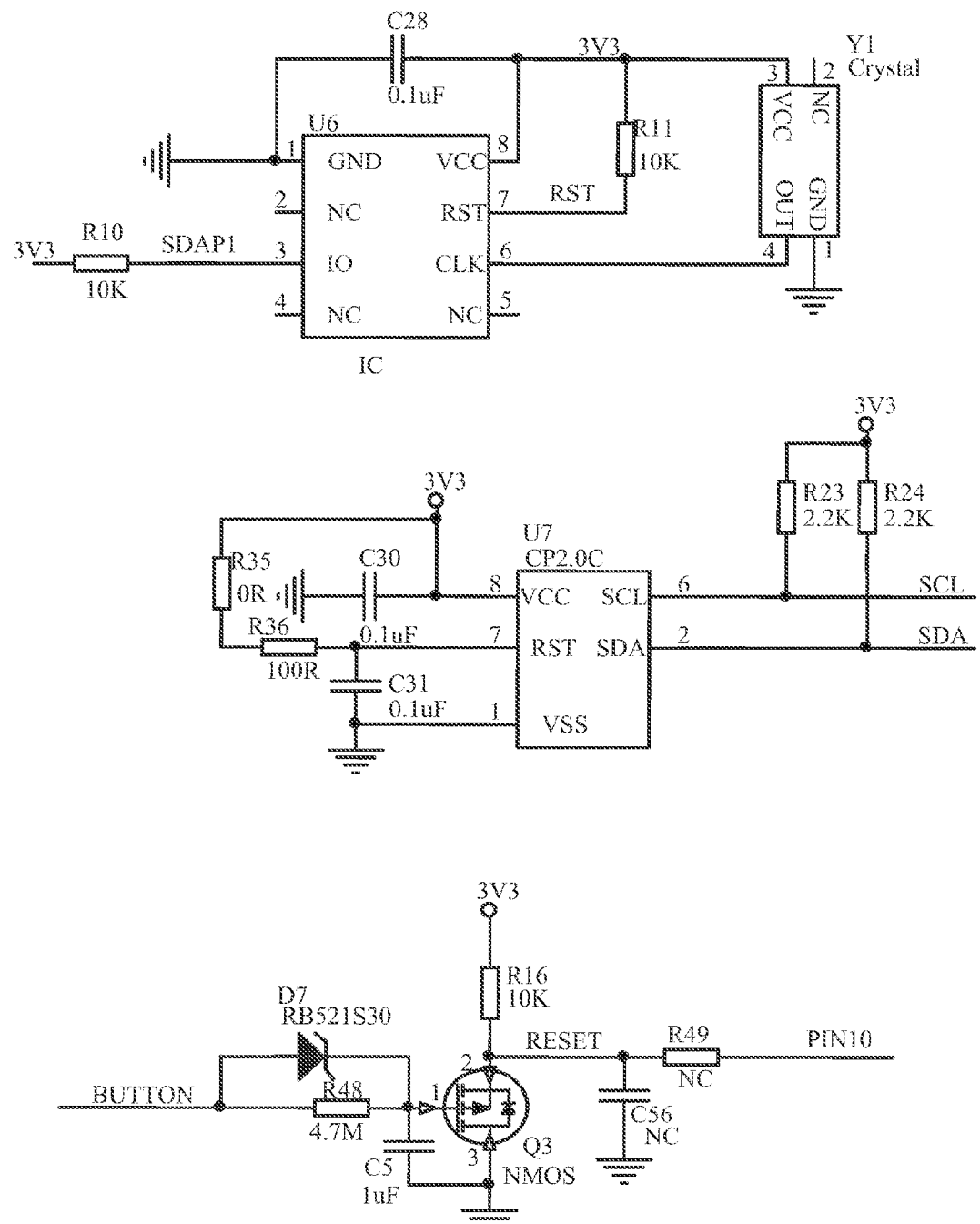
Figure 13:
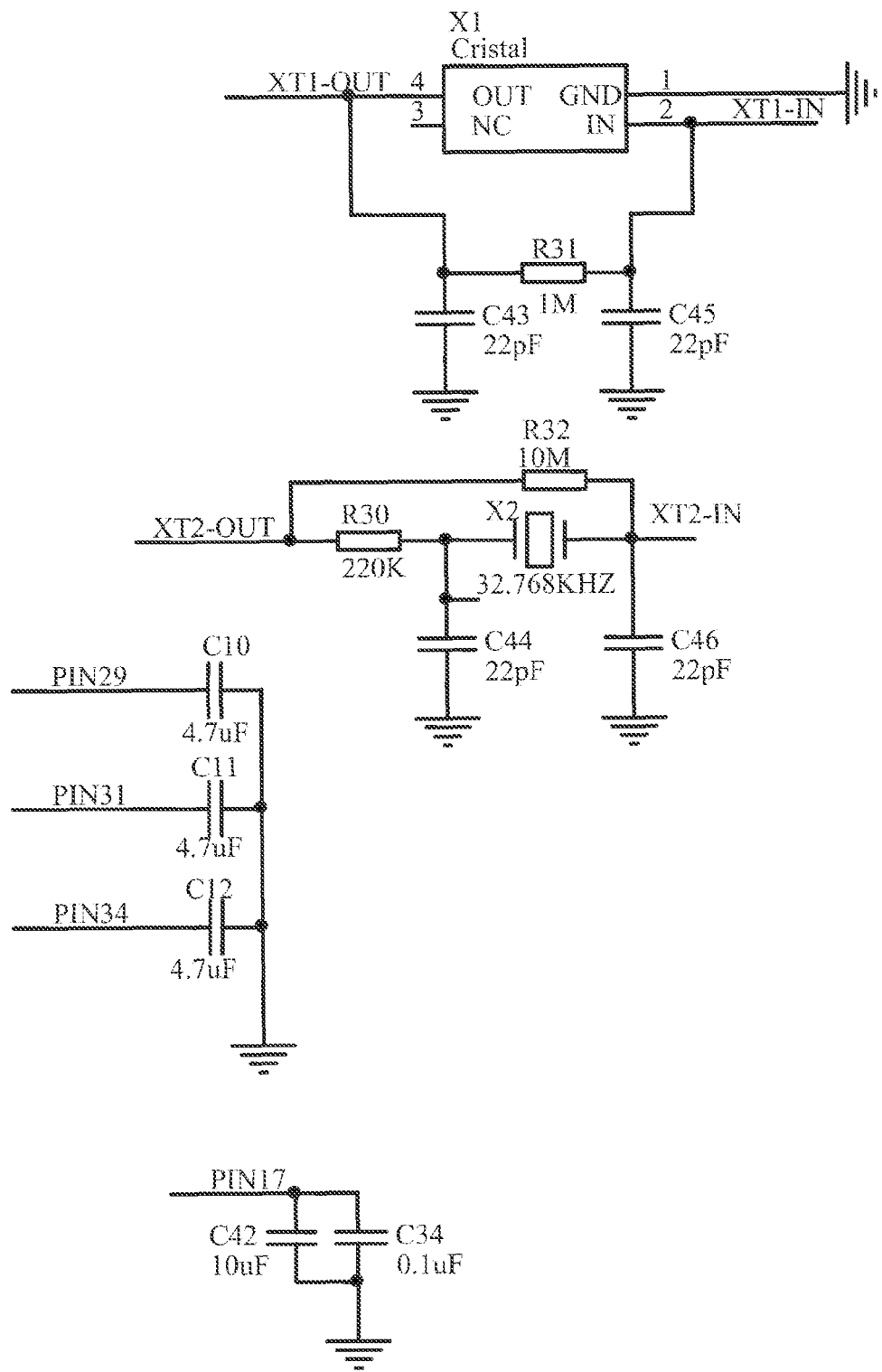

Referring to FIG. 5, in the illustrated embodiment, the electronic device is an iPhone 430 having a lightning interface, the iPhone 430 is connected to the mobile power device 410 through a lightning cable 420. The data storing module of the mobile power device 410 uses a Nand-Flash memory as a storing media. The data storing module includes an integrated chip which is authenticated by Apple CP2.0C, and it is configured to exchange data and communicate with the iPhone 430.

FIG. 6-FIG. 9 and FIG. 10-FIG. 13 are schematic circuit diagrams of an embodiment of the mobile power device with storage feature. In the illustrated embodiment, the mobile power device with storage feature is designed for a mobile phone or a tablet computer having an iOS operating system. Specifically, the central processing unit U9 is configured to control the whole mobile power device with storage feature. The charging module and the output module control the power supply to charge and discharge through the same charging and discharging chip U2. The data storing module uses a Nand-Flash memory as a storing media. The data storing module includes an integrated chip U7 authenticated by Apple CP2.0C, which is configured to exchange data and communicate with a mobile phone or a tablet computer (such as iPhone or iPad) having an iOS operating system.

Although the present invention has been described with reference to the embodiments thereof and the best modes for carrying out the present invention, it is apparent to those skilled in the art that a variety of modifications and changes may be made without departing from the scope of the present invention, which is intended to be defined by the appended claims.

What is claimed is:

1. A mobile power device with storage feature, comprising:
   a battery;
   an output module connected to the battery;
   a central processing unit connected to the output module; and
   a data storing module connected to the central processing unit, the data storing module comprising:
      a storing circuit configured to store data; and
      a controlling circuit configured to exchange data and communicate with an electronic device having a target operating system according to an instruction of the central processing unit;
   wherein the central processing unit is configured to detect whether the electronic device is connected, if the central processing unit detects that the electronic device is connected, the electronic device is recognized as a slave device and the mobile power device with storage feature is recognized as a master device, and the central processing unit sends a discharging control instruction to control the output module to provide power to the electronic device;
   the central processing unit is also configured to further detect whether an operating system of the electronic device is the target operating system; when the central processing unit detects that the operating system of the electronic device is the target operating system, the electronic device is recognized as a master device and the mobile power device with storage feature is recognized as a slave device, the central processing unit manages data in the data storing module according to an operating instruction sent by the electronic device;
   the central processing unit further configured to detect that the operating system of the electronic device is not the target operating system and prevent communicating with the electronic device and provide power to the electronic device.

2. The mobile power device according to claim 1, wherein the data storing module is a nonvolatile storing media.

3. The mobile power device according to claim 1, wherein the control unit is an integrated chip configured to exchange data and communicate with the electronic device according to an instruction of the central processing unit.

4. The mobile power device according to claim 1, wherein the central processing unit is configured to receive a read or a write instruction from the electronic device and read or write data in the storing circuit according to the read or the write instruction.

5. The mobile power device according to claim 1, further comprising an operating displaying module connected to the central processing unit, wherein the operating displaying module is configured to display a battery level information and a battery status of the battery; the operating displaying module is also configured to display data in the data storing module according to an instruction of the central processing unit.

6. The mobile power device according to claim 5, wherein the operating displaying module comprises a displaying unit and an operating unit, the operating unit is selected from a group consisting of a button, a touch control, and a jog switch; the displaying unit is a LCD screen or a LED screen.

7. The mobile power device according to claim 5, further comprising a charging module and a protecting module, wherein the protecting module is connected to the charging module and the output module respectively, the charging module is also connected to the central processing unit;
   wherein the central processing unit is also configured to detect whether an external power supply is connected, when the central processing unit detects that the external power supply is connected, the central processing unit sends a charging control instruction to control the charging module to charge the battery; the battery is connected to the charging module through the protecting module.

8. The mobile power device according to claim 7, further comprising an input interface, an output interface, and an interface managing chip; wherein the input interface and the output interface are connected to the interface managing chip respectively, the input interface is connected to the charging module, the output interface is connected to the output module, the output interface is connected to the electronic device.

9. The mobile power device according to claim 8, wherein the input interface is a standard USB interface or a micro-USB interface; the output interface is a standard USB interface or a micro-USB interface.

10. The mobile power device according to claim 8, further comprising a first housing, a second housing, a first printed circuit board, and a second printed circuit board; wherein the first housing and the second housing are removably connected and form a cavity with the battery, the first printed circuit board, and the second printed circuit board being received in the cavity; the charging module, the output module, the protecting module, and the central processing unit are located on the second printed circuit board; the data storing module is located on the first printed circuit board, the operating displaying module is located on the first housing.

* * * * *